US010540886B2

(12) United States Patent
Hamilton et al.

(10) Patent No.: US 10,540,886 B2
(45) Date of Patent: Jan. 21, 2020

(54) NETWORK DIAGNOSTIC TOOL FOR TESTING AND COMMISSIONING BUILDING SYSTEMS

(71) Applicant: Siemens Industry, Inc., Alpharetta, GA (US)

(72) Inventors: Mark Hamilton, Budd Lake, NJ (US); Ulrich Viereck, Jamaica Plain, MA (US); Shauna Jenkins, Fords, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 30 days.

(21) Appl. No.: 14/498,786

(22) Filed: Sep. 26, 2014

(65) Prior Publication Data
US 2016/0093203 A1 Mar. 31, 2016

(51) Int. Cl.
*G06F 15/173* (2006.01)
*G08B 29/14* (2006.01)

(52) U.S. Cl.
CPC .................. *G08B 29/145* (2013.01)

(58) Field of Classification Search
CPC ...... G08B 29/145; A62C 37/36; G01M 99/00; G01N 35/00871; H04L 43/04; H04L 43/0823
USPC ....................................................... 709/224
See application file for complete search history.

(56) References Cited

U.S. PATENT DOCUMENTS

| | | | | |
|---|---|---|---|---|
| 4,688,183 A * | 8/1987 | Carll | ...................... | G08B 25/04 340/3.4 |
| 7,356,372 B1 * | 4/2008 | Duncan | .............. | G07C 9/00103 340/506 |
| 8,548,630 B2 * | 10/2013 | Grohman | ........... | B60H 1/00642 700/276 |
| 8,655,491 B2 * | 2/2014 | Hadzidedic | .............. | F24F 11/77 700/276 |
| 8,963,727 B2 * | 2/2015 | Kates | ................. | G01N 33/0065 340/628 |
| 2004/0260812 A1 * | 12/2004 | Rhodes | .................... | H04L 12/46 709/225 |
| 2008/0284580 A1 * | 11/2008 | Babich | ............. | G08B 13/19684 340/502 |
| 2008/0303654 A1 * | 12/2008 | Kates | ....................... | G08B 1/08 340/539.3 |
| 2011/0178977 A1 * | 7/2011 | Drees | ..................... | G05B 15/02 706/52 |
| 2015/0169734 A1 * | 6/2015 | Jain | ..................... | G06F 11/0793 707/742 |

* cited by examiner

*Primary Examiner* — Krisna Lim

(57) ABSTRACT

A method for a building system and corresponding data processing system. A method includes receiving, by a data processing system, a building system diagnostics configuration. The method includes receiving diagnostic data corresponding to the building system diagnostics configuration and processing the diagnostic data. The method includes generating a report based on the processed diagnostic data and storing or displaying the report.

20 Claims, 4 Drawing Sheets

NETWORK DIAGNOSTIC TOOL FOR TESTING AND COMMISSIONING BUILDING SYSTEMS

TECHNICAL FIELD

The present disclosure is directed, in general, to automation systems and, more particularly, to tools for managing a building automation system, including building systems such as the fire safety system in a building automation system.

BACKGROUND OF THE DISCLOSURE

Building automation systems encompass a wide variety of systems that aid in the monitoring and control of various aspects of building operation. Building automation systems include security systems, fire safety systems, and comfort systems that control environmental parameters such as heating, ventilation, and air conditioning ("HVAC") and lighting. The elements of a building automation system are widely dispersed throughout a facility. For example, a fire safety system may include temperature sensors, smoke sensors, emergency lighting, sprinkler systems, exhaust systems, and other devices that detect or respond to fire-related occurrences, as well as other elements that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. In this system, several control stations connected via an Ethernet or another type of network may be distributed throughout one or more building locations, each having the ability to monitor and control system operation.

SUMMARY OF THE DISCLOSURE

Various embodiments include systems, methods and mediums. A method includes receiving, by a data processing system, a safety system diagnostics configuration. The method includes receiving diagnostic data corresponding to the safety system diagnostics configuration and processing the diagnostic data. The method includes generating a report based on the processed diagnostic data and storing or displaying the report.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conceptions and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Various embodiments of the disclosed invention relate to a network diagnostics tool for a building (i.e., facilities) management system, and in particular for the testing and commissioning of fire alarm systems. Disclosed embodiments can show the overall health of a fire alarm system or other safety system before or after commissioning.

Figure 1:
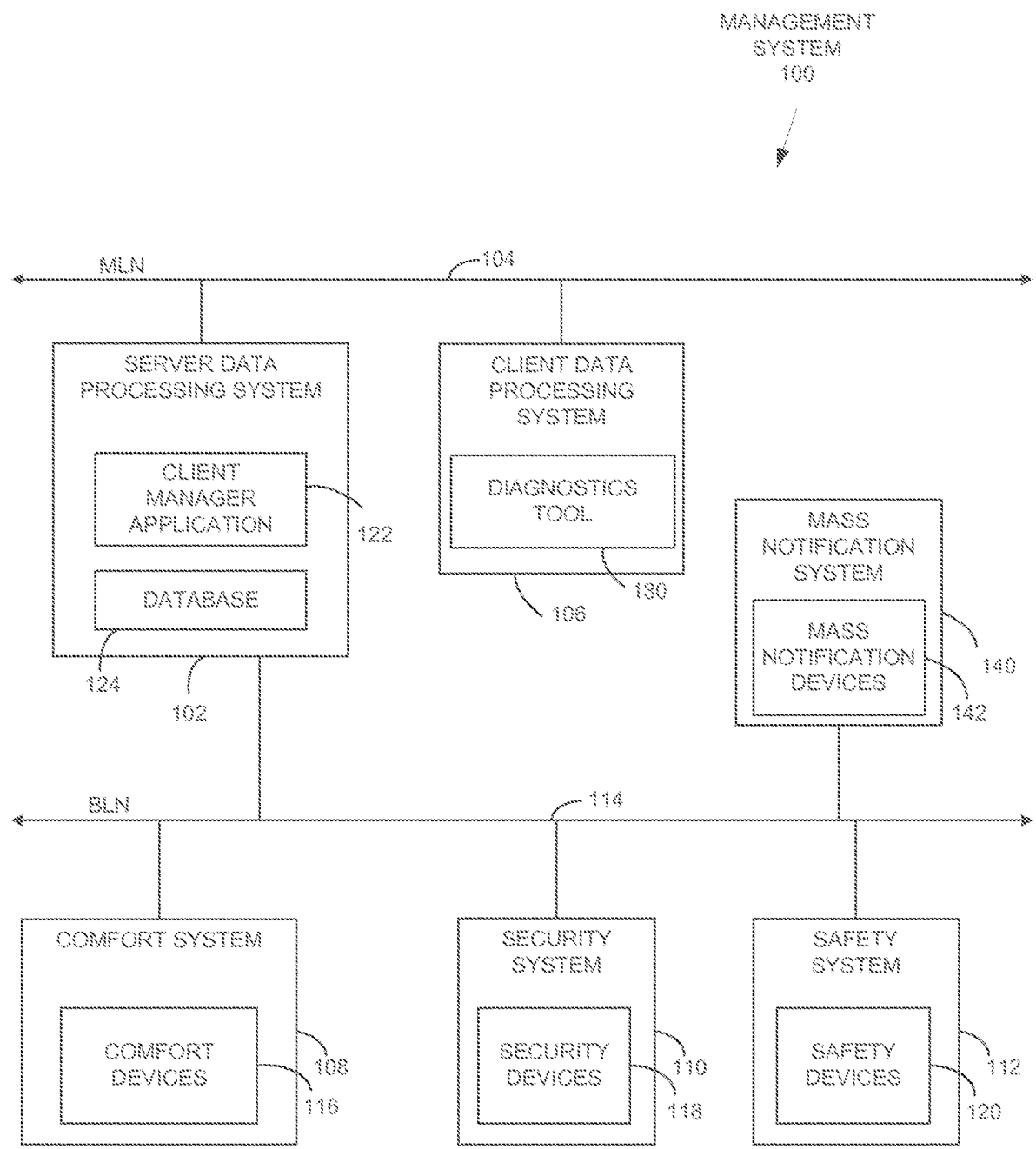
FIG. 1 illustrates a block diagram of a management system in which various embodiments of the present disclosure may be implemented.

FIG. 1 illustrates a block diagram of management system 100 in which various embodiments of the present disclosure may be implemented. In this illustrative embodiment, the management system 100 includes a server data processing system 102 connected, via a management level network (MLN) 104 to an installed client data processing system. The MLN 104 is a medium used to provide communication links between various data processing systems and other devices in the management system 100. MLN 104 may include any number of suitable connections, such as wired, wireless, or fiber optic links. MLN 104 may be implemented as a number of different types of networks, such as, for example, the Internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this example, the management system 100 may also include a mass notification system 140, with associated mass notification devices 142, that is connected to BLN 114. Mass notification system 140 and mass notification devices 142 may make mass notifications to users, building tenants, the public, or others using technologies such as emails, signs, video, text messaging, Twitter® messaging, social media messaging, and others.

In this illustrative embodiment, server data processing system 102 is operably connected to comfort system 108, security system 110, and safety system 112 via building level network (BLN) 114. The term "building system," as used herein, can include one or more of the comfort system 108, security system 110, and safety system 112, including their respective devices and components described herein. The comfort system 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection. As discussed herein, the safety system 112 particularly includes fire alarm systems.

As depicted, the comfort system 108 includes comfort devices 116, the security system 110 includes security devices 118, and the safety system 112 includes safety devices 120. The devices 116-120 may be located inside or in proximity to one or more buildings managed using the management system 100. The devices 116-120 are configured to provide, monitor, and/or control functions of the comfort system 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the comfort system 108, the security system 110, the safety system 112, and/or the server data processing system 102. Field devices (such as sensors, actuators, cameras, light devices, heaters, chillers and other HVAC, security and fire safety devices may be connected via a field level network to a field panel or field controller for monitoring and controlling the respective field devices within a room, floor or other space of a building.

In particular, safety system 112 and safety devices 120 may include field devices, fire panels, and bus interconnections as described in more detail below.

Various embodiments of the present disclosure are implemented in the management system 100. The management system 100 allows for systems and devices located throughout one or more buildings to be managed, monitored, and controlled from a single point and in a uniform manner. For example, a client manager application 122 may be installed on a server data processing system 102. The client manager application 122 is a collection of software and associated data files. The client manager application 122 may include, for example, without limitation, executable files, user layout definition files, rules files, graphics control modules, an infrastructure interface, and/or a number of software extensions. A diagnostics tool 130, also a collection of software and associated data files described further below, may be installed on an installed client data processing system 106.

The server data processing system 102 includes a database that stores information about the devices 116-120 within the management system 100. A database 124 includes one or more data models of data points, devices, and other objects in the management system 100. For example, the database 124 may store values for devices in the comfort system 108 (e.g., temperature, alarm status, humidity). These values may each be referred to as a point or data point. As referenced herein, a "point" or "data point" may be (i) any physical input or output to or from a respective controller, field device, sensor or actuator, or (ii) any virtual point associated with a control application or logic object within a field controller or field panel of the systems 108-112 that is measured, monitored or controlled. The database 124 may also store static information, such as, model numbers, device types, and/or building and room installation location information about devices in the management system 100. The database 124 may also store graphical models of one or more buildings managed by the management system 100. For example, the graphical models may include layouts and schematics of one or more rooms, floors, and buildings managed by the management system 100.

In these illustrative embodiments, objects in the management system 100 include anything that creates, processes or stores information regarding data points or otherwise serves as a software proxy for a data point, such as analog, binary, or multistate inputs and outputs of physical devices (e.g., controllers, field panels, sensors, actuators, valves, power switches, cameras, etc.). For example, one or more of the devices 116-120 may be associated with one or more objects. One or more of the objects may have properties that are based on a data point of a device in the devices 116-120. Objects may also include data files, such as, control schedules, calendars, trend reports, and the like.

In various embodiments, the database 124 includes hierarchy definitions that identify relationships between objects in the system. For example, a hierarchy may include a folder for "floor" in a building with multiple child folders in the form of "rooms". Each "room" folder, in turn, may have several child objects, such as "ventilation damper", "smoke detector", and "temperature sensor". Such hierarchy definitions among objects are conventional in nature and may take many forms. It will be appreciated that the use of hierarchical files in the management system 100 allows for technicians to define nearly any desirable hierarchy, the result of which is stored as a defined hierarchical file. The database 124 stores files identifying different versions of hierarchies between the objects of the system, including those representatives of the devices 116-120.

The server data processing system 102 includes an object manager application to detect and manage objects in the management system 100. The object manager application is a software application that runs on the server data processing system 102. The object manager application includes functionality for searching for and discovering objects on the BLN 114 or objects on an FLN corresponding to points of field devices 116, 118 and 120 managed by a field panel or field controller in the comfort system 108, security system 110 or safety system 112. For example, the server data processing system 102 may periodically search for objects and devices that are connected to the BLN 114. The object manager application also includes functionality for organizing the discovered objects into hierarchies based on the location of the devices in the building or buildings managed by the management system 100. For example, the server data processing system 102 may generate and store one or more hierarchies in the database 124. The client data processing system 106a and web client data processing system 106b may present a building manager with a logical view of the objects according to the hierarchy as described herein.

The client manager application 122 may further include software extensions or services that provide operations of the management system 100. For example, the software extensions may include a print manager, a reporting subsystem, and a status propagation manager. For example, a reporting subsystem implemented on a workstation data processing system (e.g., server data processing system 102 and client data processing system 106) is a system that manages the acquisition of data values from the database 124 for the generation of various reports. Such reports may include, for example, trends for a temperature of a room or the like. In another example, the status propagation manager implemented on a workstation data processing system (e.g., server data processing system 102, installed client data processing system 106a, or web client data processing system 106b) propagates alarm status information, among other things, to various other data objects in the system. An example of a suitable alarm propagation system is provided in U.S. patent application Ser. No. 12/566,891, filed Sep. 25, 2009, which is assigned to the assignee of the present invention and is incorporated by reference herein.

The server data processing system 102 is connected to the BLN 114 and includes one or more hardware and/or software interfaces for sending and receiving information to and from the devices 116-120 in the comfort system 108, the security system 110, and/or the safety system 112. For example, the server data processing system 102 may request and receive data regarding a status of one or more devices in the devices 116-120. The client manager application 122, via server data processing system 102, provides a user with the functionality to monitor real-time information about the status of one or more devices and objects in the management system 100. The client manager application 122, via server data processing system 102, also provides a user with the functionality to issue commands to control one or more devices and objects in the management system 100. For example, one or more of the devices 116-120 may operate on a network protocol for exchanging information within the management system, such as the BACnet communications protocol, the LonTalk protocol, or Internet Protocol communications, among others.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the client manager application 122 may be implemented in different data processing systems in the management system 100. In other examples, embodiments of the management system 100 may not include one or more of the comfort system 108, the security system 110, and/or the safety system 112.

Figure 2:
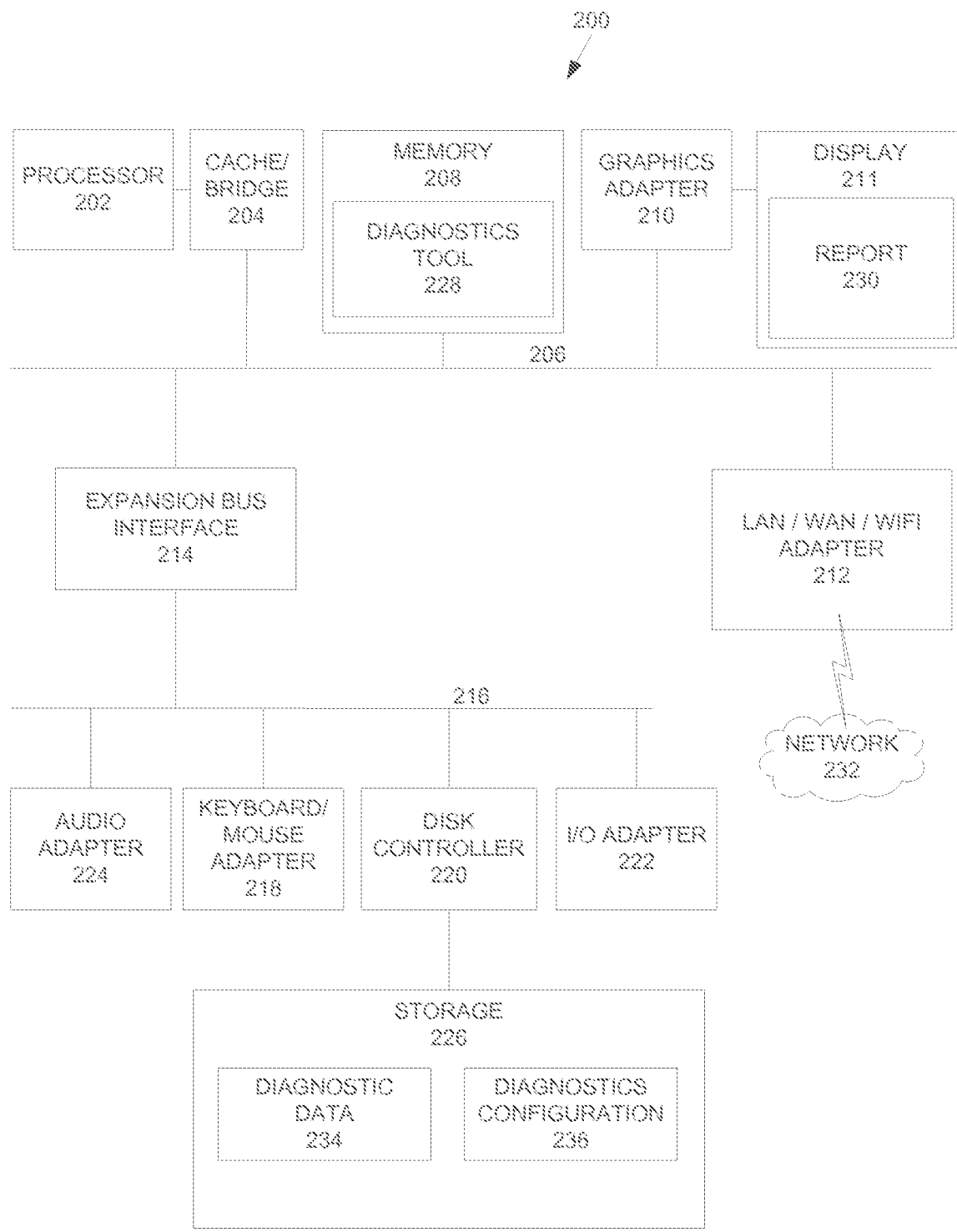
FIG. 2 depicts a block diagram of a data processing system in which various embodiments may be implemented.

FIG. 2 depicts a block diagram of a data processing system 200 in which various embodiments may be implemented. The data processing system 200 is an example of one implementation of the installed client data processing system 106 in FIG. 1, and may also serve as an example of the server data processing system 102 in FIG. 1.

The installed data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, magnetic, or other technology storage devices. Storage 226 may store any received diagnostic data 234 or diagnostics configuration 236, discussed below.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

In various embodiments of the present disclosure, the data processing system 200 is implemented as an installed workstation with a diagnostics tool 228. The diagnostics tool 228 is described in more detail below. For example, the processor 202 executes program code of the diagnostics tool 228 for testing and commissioning of safety systems and to generate report 230 displayed on display 211.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system may be modified or created in accordance with the present disclosure as described, for example, to implement the building system diagnostic processes described herein.

The LAN/WAN/Wifi adapter 212 may be connected to a network 232, such as, for example, MLN 104 in FIG. 1. As further explained below, the network 232 may be any public or private data processing system network or combination of networks known to those of skill in the art, including the Internet. Data processing system 200 may communicate over network 232 to one or more computers, which are also not part of the data processing system 200, but may be implemented, for example, as a separate data processing system 200.

Figure 3:
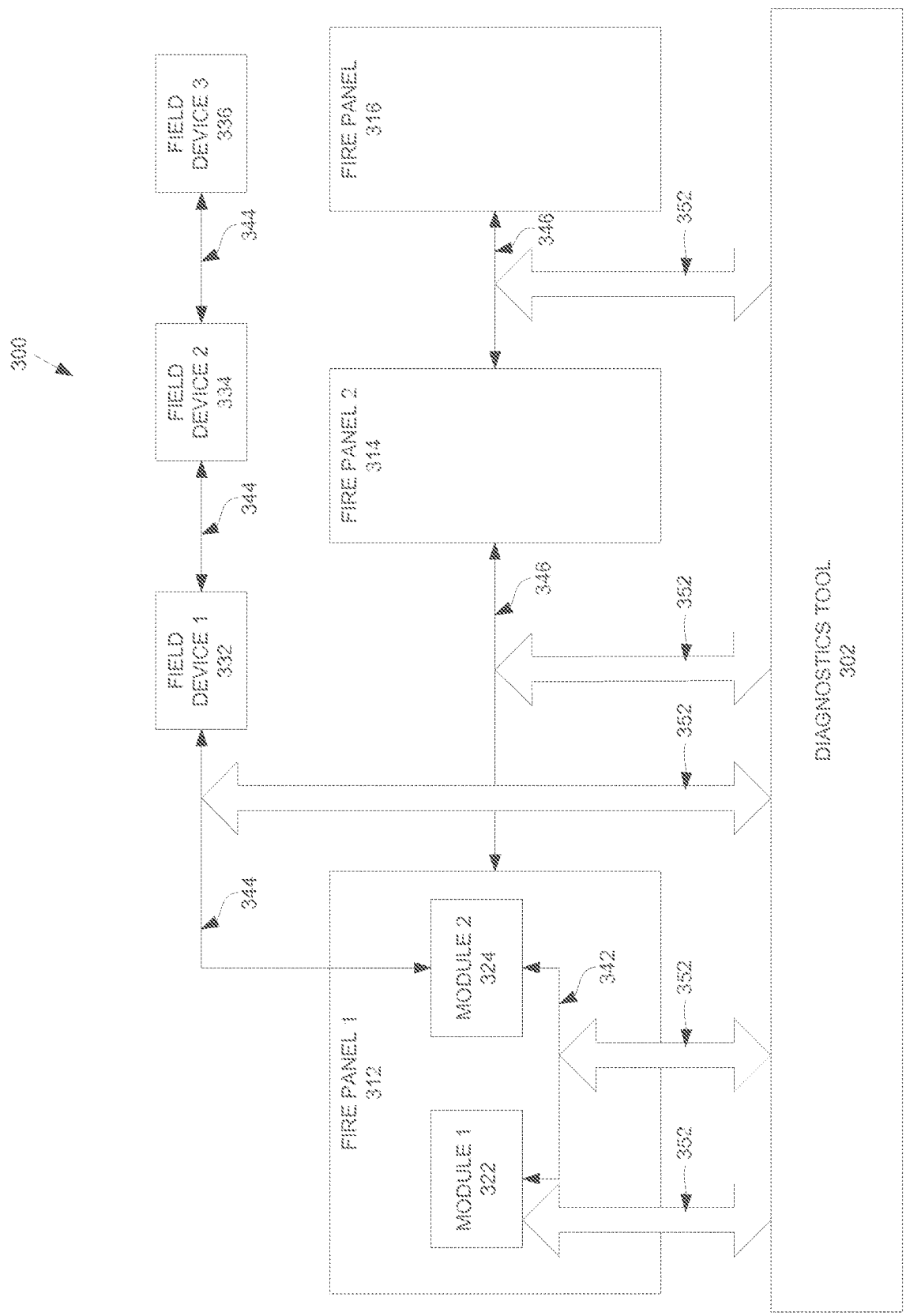
FIG. 3 illustrates communications for a safety system, such as a fire alarm system or otherwise, and a network diagnostics tool in accordance with disclosed embodiments.

FIG. 3 illustrates communications for a building system 300, such as a comfort system 108, security system 110, and safety system 112, fire alarm system, or otherwise, and a network diagnostics tool in accordance with disclosed embodiments. In this example, diagnostics tool 302 may be implemented in, for example, a client manager application 122 or as a standalone application.

In this example, the building system 300 is a safety system as described herein, and includes a plurality of fire panels 312/314/316 that communicate with each other over panel communication bus 346. Each of the fire panels 312/314/316 may have one or more fire modules 322/324, which may perform fire detection, monitoring, and response functions, as well as other functions. Each of the fire modules 322/324 may store data related to their functions, and include appropriate processors, memories, etc. The fire modules 322/324 in each panel may communicate with each other over a module bus 342. Building system 300 also includes a plurality of field devices 332/334/336, which communicate with each other and with the fire modules over a field device bus 344. Note that each of the busses discussed herein may be a single bus or may be multiple communication busses acting together, and may be implemented using any known networking or other communications techniques. Each of the busses described in safety system 300 may be implemented as a simple wire bus or may be implemented using networking techniques. For example, a bus may be a switched Ethernet connection, where monitoring traffic across the bus may be implemented by a separate connection to that switch that "watches" the traffic between devices on that network connection.

In this example, diagnostic tool 302 may monitor and communicate with each of the busses 342/346/344, as illustrated by connections 352. Communications over these busses may operate on a network protocol for exchanging information within the management system, such as the BACnet communications protocol, the LonTalk protocol, or Internet Protocol communications, among others. According to various disclosed embodiments, diagnostic tool 302 may measure network traffic across any of the busses and determine if the amount is acceptable. Diagnostic tool 302 may identify potential issues before the safety system 300 goes into a "trouble" condition, such as when the system is aware of an issue and it is reported via user interface. Diagnostic tool 302 may provide real time analyses of communications across any of the busses of the safety 300. Diagnostic tool 302 may provide a report on the overall health of the safety system 300 in easy to understand language. Diagnostic tool 302 may collect data which can be returned to the manufacturer, factory, or enterprise owner for the purpose of obtaining metrics on the performance building system 300. Diagnostic tool 302 may monitor and report on multi network protocols at one time. Diagnostic tool 302 may direct technicians to potential problem areas based on the data collected and instruct the technician on what area to check for maintenance or further diagnostics. Diagnostic tool 302 may provide synchronization between these or other network devices and tools. Diagnostic tool 302 may compare baseline figures to present conditions on a network and store results in the "cloud" or in other remotely-accessible storage. Diagnostic tool 302 may collect data, logs, or other information from multiple nodes or devices and merge this information for a more comprehensive analysis.

Figure 4:
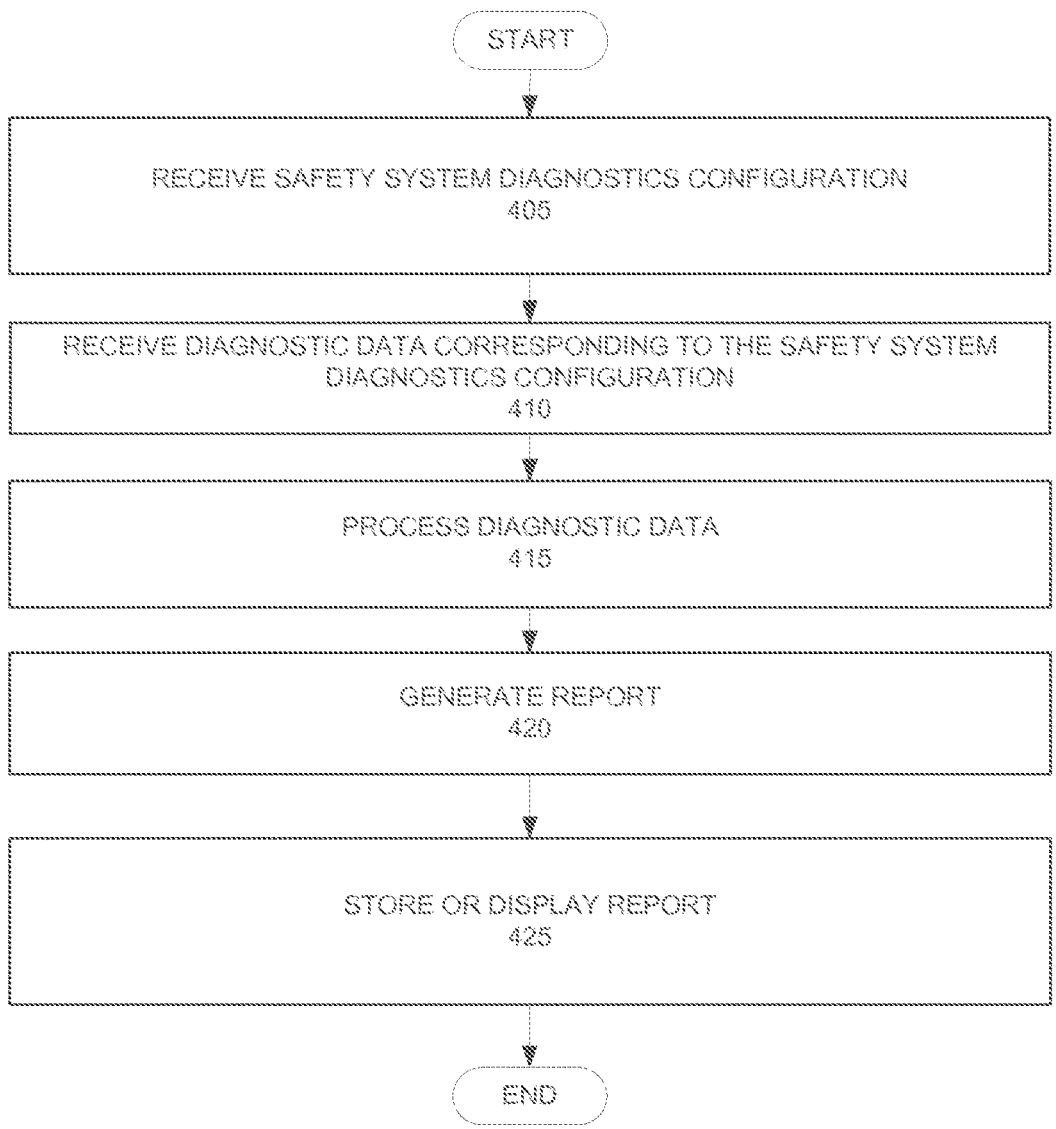
FIG. 4 illustrates a flowchart of a process for testing and commissioning of safety systems, such as fire alarm systems, in accordance with disclosed embodiments.

FIG. 4 illustrates a flowchart of a process for testing and commissioning of building systems, such as comfort systems, security systems, safety systems, and fire alarm systems, in accordance with disclosed embodiments. Such a process may be performed when the building system is first commissioned, to ensure proper behavior, or at any time thereafter for testing purposes. This process may be performed, for example, by a diagnostics tool 302 in a management system 100, executed by a data processing system 200, generically referred to below as the "system." The diagnostics tool 302 may execute on a data processing system permanently integrated in the management system 100 or may execute on a data processing system that is temporarily connected to management system 100 in order to perform testing and commissioning as described herein.

The system receives the building system diagnostics configuration (405). "Receiving," as used herein, may include loading from storage, receiving from another device or process, receiving via an interaction from a user, or otherwise. The building system diagnostics configuration may include the intended scope of the diagnostics. The intended scope may include, for example, which networks and modules should be included and the level of diagnostics to be performed. This configuration may affect the time to run the data collection and also the physical connections that will be monitored.

The system receives diagnostic data corresponding to the building system diagnostics configuration (410). This may be performed by the system monitoring and communicating over one or more of the busses 342/346/344 as illustrated in FIG. 3. The diagnostic data may include any data sent over any of the connected busses, representing any data communicated by or to any of the modules or other devices. The system may synchronize the timestamps, such as data packet timestamps, between different networks or busses, and may also generate a common timestamp or use other techniques to synchronize the different data busses. For example, the system may capture all the data of the different busses in real-time and add a common timestamp to the data when they are received, which allows the system to correlate data or events on one bus with data or event on another bus. Receiving the diagnostic data may be passive, where the system only "listens" to the traffic on the busses. Receiving the diagnostic data may be active, where the system requests data from or "pings" the various modules or other devices. The active method could also activate diagnostics mode of devices or systems (such as devices and systems 108-120 of FIG. 1) and collect additional data for analysis of the system to verify the health or condition of the system.

The system processes the diagnostic data (415). This processing may include, for example, one or more of performing an analysis of diagnostic data, performing consistency checks of the diagnostic data, detecting unexpected behavior in the diagnostic data, detecting unexpected data/messages or unusual messages (such as NACKs) in the diagnostic data, identifying unexpected modules or devices from the diagnostic data, identifying missing modules or devices from the diagnostic data, detecting scrambled messages in the diagnostic data, and other processes. A NACK refers to a "not acknowledge" message that may be sent, for example, if a device is busy and cannot respond, if a received message is not understood (e.g., it is invalid or includes unexpected data), or if other communication problems occur.

The system generates a report based on the processed diagnostic data (420). The report may be, for example, a quick result overview, indicating that there were no issues found, some potential issues, or significant issues. The report may be, as another example, detailed results and reports such as identifying what was actually checked or tested, for example as compared to the building system diagnostics configuration, and identifying the building system diagnostics configuration, general information like hardware and software versions of detected modules and devices, data such as the percentage of network utilization, when and how many NACK messages are detected for any module, etc. The report may include suggested steps how to troubleshoot or fix issues (if any) by a technician. The report may include suggested remedies to fix any problems or, if the root cause could not be determined or the results are not conclusive, recommendations how to test or investigate further. The system may process data (as in 415) and produce reports (as in 420) in real time while the diagnostic data is being received (as in 410).

The system stores or displays the report (425). This may include displaying color indicators such as green for no issues found, yellow for some potential issues, and red for significant issues. This may include providing an export report in portable document format (PDF). This may include exporting all data and report files to be sent elsewhere for archival or further analysis.

An example of the use of such a system is to determine whether an alarm event is properly propagated between a first fire panel, such as fire panel 312, and a second fire panel, such as fire panel 314. In this example, consider that the first fire panel includes an internal communications network such as module bus 324, and the second fire panel includes a similar internal communications network (not illustrated in FIG. 3, but as described above). In such a case, the internal communications network typically only carries data that is related to the equipment located within that fire panel, such as modules 322 and 324.

The first and second fire panels communicate between each other over an inter-panel communications network such as communication bus 346. Any data that is shared between the first and second fire panels is communicated over the inter-panel communications network.

A system as disclosed herein can verify that events on the first fire panel are correctly communicated to the second fire panel.

In this example the diagnostics tool 302 is connected to the internal communications networks of both the first fire panel and the second fire panel. This can be accomplished, in some embodiments, by making connections 352 to both of these internal communications networks by the same instance of the diagnostics tool 302; in other embodiments, separate instances of the diagnostics tool 302 can be connected to each of the internal communications networks.

The system receives a building systems diagnostics configuration, as in 405, that indicates, in this example, that network traffic over the internal communications networks and the inter-penal communications network should be monitored for alarm events, communications over these networks should be logged, time-stamped, and synchronized.

The system receives diagnostic data corresponding to the building system diagnostics configuration, as in 410, so that it is receiving and logging the data as specified. In this example, as this is occurring, the system generates a fire alarm event in the first fire panel that should be communicated over the internal communication network of the first fire panel, to the second fire panel over the inter-panel communications network, and over the internal communication network of the second fire panel. All these communications are received and stored as the diagnostic data.

In cases where multiple instances of the diagnostics tool 302 are used, the system can combine and synchronize the various logged transmissions so that all diagnostics data can be considered together.

The system processes the diagnostic data, as in 415, to verify that the alarm event appears on the internal communication network of the first fire panel, on the inter-panel communications network, and on the internal communication network of the second fire panel. The system can then determine, based on the timestamp of the alarm event as it appears on the internal communication network of the first fire panel, on the inter-panel communications network, and on the internal communication network of the second fire panel, if any time delay in the transmission of the alarm event is within a predetermined minimum acceptable time.

The system can then generate a report, as in 420, that indicates the result of the diagnosis. For example, the report can indicate whether or not the alarm event properly appeared on the internal communication network of the first fire panel, on the inter-panel communications network, and on the internal communication network of the second fire panel. If it did not, the report can indicate which networks properly received the alarm event, and where the communications may have broken down. The report can indicate any delay in propagation of the alarm event, and where that delay may have occurred. The report can indicate possible solutions or remedial actions to be taken.

The system can then store or display the report, as in 425.

In other examples, any or all messages can be logged as described above in addition to or instead of alarm events. These messages can be logged, time-stamped, and recorded as above, and can include messages over any of the busses described above. Processing the diagnostic data can then include determining if any messages are missing from a bus on which they should be communicated, the volume of messages passed across busses, or other data.

The report can include such information as contains statistical information about the performance of the network.

The report contains information such as the bandwidth utilization over time (as a histogram or otherwise), the percentage of lost or missing messages, the directionality of lost any lost messages (such as when messages are correctly passed from a first fire panel to a second fire panel, but are missing in communications from the second fire panel to the first fire panel). The report can also indicate if any performance data is outside of acceptable limits.

Those skilled in the art will recognize that, for simplicity and clarity, the full structure and operation of all data processing systems suitable for use with the present disclosure are not being depicted or described herein. Instead, only so much of a management system as is unique to the present disclosure or necessary for an understanding of the present disclosure is depicted and described. The remainder of the construction and operation of management system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and other known optical, electrical, magnetic, or other technology storage devices.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke, in the United States, 35 USC § 112(f) unless the exact words "means for" are followed by a participle.

What is claimed is:

1. A method for a building system comprising the steps of:
   receiving, by a data processing system, a building system diagnostics configuration;
   transmit, by the data processing system to a field device, a request for diagnostic data based on the building system diagnostic configuration,
   receiving, by the data processing system from the field device, the diagnostic data corresponding to the transmitted request, wherein the diagnostic data includes additional data for analysis of the field device in the building system;
   processing the diagnostic data by the data processing system, wherein processing the diagnostic data includes determining a delay in propagation of an alarm event over a plurality of networks based on a timestamp of the alarm event appearing on an internal communication network of a first fire panel, a timestamp of an inter-panel communication network, and a timestamp on an internal communication network of a second field device;
   verifying a health or condition of the field device using the additional data before a trouble condition is detected;
   identifying a potential issue of the field device using the additional data before the building system is aware of an actual issue related to the potential issue and before the building system reports the actual issue;
   generating a report based on the processed diagnostic data, the verified health or condition of the field device, and the identified potential issue of the field device by the data processing system, wherein the report indicates the delay in the propagation of the alarm event over the plurality of networks; and
   storing or displaying the report by the data processing system.

2. The method of claim 1, wherein the field device is a fire panel.

3. The method of claim 1, wherein:
   the building system is a fire alarm system;
   the building system diagnostics configuration indicates that network traffic on the plurality of networks should be monitored for alarm events, and communications over the plurality of networks should be logged, time-stamped, and synchronized;
   the diagnostics data comprises at least one alarm event that is communicated over the plurality of networks;
   processing the diagnostics data includes verifying whether the alarm event is communicated over each of the plurality of networks; and
   the report further indicates whether the alarm event is communicated over each of the plurality of networks.

4. The method of claim 1, wherein the building system diagnostics configuration includes an intended scope of a diagnostics.

5. The method of claim 4, wherein the intended scope of the diagnostics identifies the field device, a time to run data collection, and a physical connection that will be monitored.

6. The method of claim 1, wherein the diagnostic data includes data received over a plurality of connected busses, and wherein the data processing system synchronizes timestamps of the received diagnostic data.

7. The method of claim 1, wherein the diagnostic data includes:
   a physical input from the field device; and
   a physical output from the field device.

8. The method of claim 1, wherein the diagnostic data includes a virtual point associated with a control application or a logic object within a field device.

9. The method of claim 1, wherein processing the diagnostic data includes one or more of performing an analysis of diagnostic data, performing consistency checks of the diagnostic data, detecting unexpected behavior in the diagnostic data, or detecting unexpected data/messages or unusual messages in the diagnostic data.

10. The method of claim 1, wherein processing the diagnostic data includes one or more of identifying unexpected modules or devices from the diagnostic data, identifying missing modules or devices from the diagnostic data, or detecting scrambled messages in the diagnostic data.

11. A building system, comprising:
    a data processing system including a processor, and an accessible memory, wherein the processor is configured to:
    receive a building system diagnostics configuration,
    transmit, to a field device, a request for diagnostic data based on the building system diagnostics configuration,
    receive, from the field device, the diagnostic data corresponding to the transmitted request, wherein the diagnostic data includes additional data for analysis of the field device in the building system;
    process the diagnostic data, wherein to process the diagnostic data includes determining a delay in propagation of an alarm event over a plurality of networks based on a timestamp of the alarm event appearing on an internal communication network of a first fire panel, a timestamp of an inter-panel communication network, and a timestamp on an internal communication network of a second field device;

verify a health or condition of the field device using the additional data before a trouble condition is detected;

identify a potential issue of the field device before the building system is aware of an actual issue related to the potential issue and before the building system reports the actual issue;

generate a report based on the processed diagnostic data, the verified health or condition of the field device, and the identified potential issue of the field device, wherein the report indicates the delay in the propagation of the alarm event over the plurality of networks; and store or display the report; and the field device including a programmable controller, a storage, and a sensor, the programmable controller configured to:

store the diagnostic data related to functions of the field device, receive the request for diagnostic data from the data processing system, and transmit the diagnostics data related to the request to the data processing system.

12. The building system of claim 11, wherein the field device is a fire panel.

13. The building system of claim 11, wherein:
the building system is a fire alarm system;
the building system diagnostics configuration indicates that network traffic on the plurality of networks should be monitored for alarm events, and communications over the plurality of networks should be logged, timestamped, and synchronized;
the diagnostics data comprises at least one alarm event that is communicated over the plurality of networks;
processing the diagnostics data includes verifying whether the alarm event is communicated over each of the plurality of networks; and
the report further indicates whether the alarm event is communicated over each of the plurality of networks.

14. The building system of claim 11, wherein the building system diagnostics configuration includes an intended scope of a diagnostics.

15. The building system of claim 14, wherein the intended scope of the diagnostics identifies the field device, a time to run data collection, and a physical connection that will be monitored.

16. The building system of claim 11, wherein the diagnostic data includes data received over a plurality of connected busses, and wherein the data processing system synchronizes timestamps of the received diagnostic data.

17. The building system of claim 11, wherein the diagnostic data includes:
a physical input from the field device; and
a physical output from the field device.

18. The building system of claim 11, wherein the diagnostic data includes a virtual point associated with a control application or a logic object within a field device.

19. The building system of claim 11, wherein processing the diagnostic data includes one or more of performing an analysis of diagnostic data, performing consistency checks of the diagnostic data, detecting unexpected behavior in the diagnostic data, or detecting unexpected data/messages or unusual messages in the diagnostic data.

20. The building system of claim 11, wherein processing the diagnostic data includes one or more of identifying unexpected modules or devices from the diagnostic data, identifying missing modules or devices from the diagnostic data, or detecting scrambled messages in the diagnostic data.

* * * * *

UNITED STATES PATENT AND TRADEMARK OFFICE
CERTIFICATE OF CORRECTION

| | | |
|---|---|---|
| PATENT NO. | : 10,540,886 B2 | Page 1 of 1 |
| APPLICATION NO. | : 14/498786 | |
| DATED | : January 21, 2020 | |
| INVENTOR(S) | : Mark Hamilton and Shauna D. Jennkins | |

It is certified that error appears in the above-identified patent and that said Letters Patent is hereby corrected as shown below:

On the Title Page

Item (72), Inventors: after "Shauna Jenkins, Fords, NJ (US)" insert -- Paul Richard Strelecki, Whitehouse Station, NJ (US) --.

Signed and Sealed this
Fourteenth Day of April, 2020

Andrei Iancu
*Director of the United States Patent and Trademark Office*